United States Patent Office 3,729,518
Patented Apr. 24, 1973

3,729,518
NOVEL THIA-ALKANOLS
Herbert Lepper Cologne-Mulheim, Wilfried Umbach, Langenfeld, Rhineland, and Werner Stein, Erkrath-Unterbach, Germany, assignors to Henkel & Cie., GmbH, Dusseldorf-Holthausen, Germany
No Drawing. Filed Sept. 10, 1970, Ser. No. 71,214
Claims priority, application Germany, Sept. 25, 1969,
P 19 48 385.3
Int. Cl. C07c *149/14*
U.S. Cl. 260—609 A    1 Claim

ABSTRACT OF THE DISCLOSURE

Novel thia-alkanols of the formula $$R-\underset{\underset{OH}{|}}{C}H-\underset{\underset{R_1}{|}}{C}H-S-A \quad (I)$$

wherein R is an aliphatic group of 1 to 22 carbon atoms, $R_1$ is selected from the group consisting of hydrogen and aliphatic group of 1 to 21 carbon atoms with the sum of carbon atoms in R and $R_1$ being 4 to 22 and R and $R_1$, taken together with the ethylene group to which they are attached form a cycloaliphatic ring of 6 to 12 carbon atoms and A is selected from the group consisting of aliphatic and cycloaliphatic of 6 to 24 carbon atoms optionally substituted with one or more groups of the formula

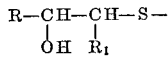

useful as pesticides, lubricant additives and intermediates for surfactants and to a novel process for their preparation.

OBJECTS OF THE INVENTION

It is an object of the invention to provide the novel thia-alkanols of Formula I.

It is another object of the invention to provide a novel process for the preparation of the thia-alkanols of Formula I without a catalyst and at normal temperatures.

These and other objects and advantages of the invention will become obvious from the following detailed description.

THE INVENTION

The novel thia-alkanols of the invention have the formula

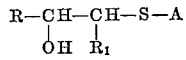

wherein R is an aliphatic group of 1 to 22 carbon atoms, $R_1$ is selected from the group consisting of hydrogen and aliphatic group of 1 to 21 carbon atoms with the sum of carbon atoms in R and $R_1$ being 4 to 22 and R and $R_1$, taken together with the ethylene group to which they are attached form a cycloaliphatic ring of 6 to 22 carbon atoms and A is selected from the group consisting of aliphatic and cycloaliphatic of 6 to 24 carbon atoms optionally substituted with one or more groups of the formula

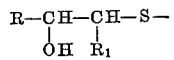

The substituent A may contain one or more double bonds and may be substituted with groups such as ethers, esters, halogens, nitro, etc. and may be interrupted by hetero atoms. When A is aliphatic, it may be straight chain or branched chain. When A is cycloaliphatic, it may have several rings and may have straight or branched chain alkyl substituents. Preferably A is aliphatic of 6 to 18 carbon atoms or cycloaliphatic of 6 to 12 carbon atoms in the ring and may be substituted with 1, 2 or 3 groups of the formula

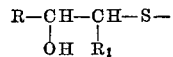

R and $R_1$ or the cycloaliphatic ring formed by R and $R_1$ and the ethylene to which they are attached may be optionally substituted and/or interrupted by hetero atoms and/or hetero atom groups such as ethers, esters, halogens, nitro, etc. and the cycloaliphatic ring may be substituted with straight or branched-chain alkyl. When R and $R_1$ are aliphatic, they may be branched or straight chain. Preferably, R is a saturated aliphatic of 1 to 16 carbon atoms and $R_1$ is hydrogen or saturated aliphatic of 1 to 15 carbon atoms with the total number of carbon atoms in R and $R_1$, is 4 to 16 or R and $R_1$, together with the ethylene to which they are attached form a saturated aliphatic of 6 to 12 carbon atoms.

The compounds of Formula I may be made by known methods such as reacting alkali metal mercaptides with a compound of the formula

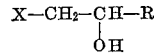

wherein X is a halogen or by reacting an alkyl halide with an alkali metal mercaptide of the formula

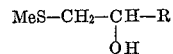

wherein Me is an alkali metal or by reacting a mercaptan with an unsymmetrical epoxide in the presence of a basic catalyst.

However, the preferred method and the novel method of the invention for the preparation of the compounds of Formula I comprises reacting at a temperature of 0° to 100° C. a hydroxyalkyl mercaptan of the formula

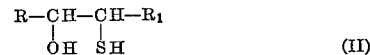

wherein R and $R_1$ have the above definition with a mono or polyunsaturated olefinic compound having 6 to 24 carbon atoms to form the corresponding compound of Formula I. The reaction is preferably effected at 20 to 80° C. at normal pressure.

In the method of the invention, no catalyst is needed for the reaction and no separation step is needed to remove catalyst from the product and there are no undesired by-products produced such as alkali metal halides as in the case of the process using alkali metal mercaptides.

Very reactive olefins such as ethylene are known to react with 2-mercapto ethanol and 2-hydroxy-1-mercapto-propane to form the corresponding β-hydroxyalkyl alkyl sulfides but this reaction requires relatively high reaction temperatures and pressures and long reaction times such as 16 hours at 150° C. and 100 atmospheres pressure. The process of the invention unexpectedly reacts long chain 2-hydroxy-1-mercapto-alkanes and liquid olefins without pressure at room temperature without the addition of a catalyst. This high degree of reactivity of the long chain 2-hydroxy-1-mercapto-alkanes is even more surprising since unsubstituted 1-mercapto alkanes of the same chain length will not react or only slightly react with the same olefins under the identical reaction conditions. This occurs in spite of the fact that the thiyl radical R—$CH_2$—$CH_2$—S— formed as an intermediate during the latter radical addition must be more easily formed than the thiyl radical R—CHOH—$CH_2$—S— of the present process which is made less stable due to the negative inductive effect of the β-hydroxy group.

The 2-hydroxy-1-mercapto-alkanes of Formula II can be advantageously prepared by reacting epoxides with hydrogen sulfide in the presence of a catalytic amount of base as described in copending, commonly assigned U.S. application Ser. No. 818,441, now U.S. Pat. No. 3,637,864 and Ser. No. 818,444, now abandoned, both filed Apr. 22, 1969 and Ser. No. 863,387 filed Oct. 2, 1969. Examples of suitable 2-hydroxy-1-mercapto-alkanes are 2-hydroxy-1-mercapto-hexane, 2-hydroxy-1-mercapto-cyclohexane, 2-hydroxy-1-mercapto-octane, 2-hydroxy-1-mercapto-dodecane, 2-hydroxy-1-mercapto-octodecane and 2-mercapto-3-hydroxy-octane.

The mono- or poly-unsaturated olefinic compounds with 6 to 24 carbon atoms used as starting materials may be straight or branched-chain compounds with terminal and/or non-terminal double bonds, and may also be substituted or interrupted by hetero-atoms or hetero-atom groups which do not upset the reaction such as, ether-oxygen, alkoxy- or ester-groups. Preferably mono- or poly-unsaturated aliphatic compounds with 6 to 18 carbon atoms and/or mono- or polyunsaturated cyclo-aliphatic compounds with 6 to 12 carbon atoms in the ring are used in the process of the invention. Examples of such compounds are: hexene, hexadiene-1,5, n-octene-1, n-octene-2, n-dodecene-1, n-octadecene-1, methyl ester of undecylenic acid, n-decatriene-1,4,9, n-octatriene-1,3,6, n-octatriene-1,3,7, cyclohexene, cyclooctene, cyclododecene, cyclohexadiene, cyclooctadiene and bicyclo-(2,2,1)-heptadiene-(2,5).

The olefinic compounds may be reacted singly or in admixture with one another. In the case of aliphatic compounds, olefinic mixtures of chain lengths corresponding to those obtained by cracking or dehydrohalogenation, by the Ziegler process, by oligo- and co-oligo-merisation of conjugated dienes or dienes with mono-olefines, may also be used.

The reaction between the olefinic compound and the β-hydroxyalkylmercaptan may be effected with a molar ratio of 1:1 to 1:n, n being the number of the double bonds present in the olefinic compound. Normally it is not necessary to use an excess of hydroxymercaptan or olefin. However, the reaction is preferably carried out with the molar ratio of olefin to β-hydroxyalkylmercaptan of 1:1 to 1:3. The reaction of mono-olefins with β-hydroxyalkylmercaptans is preferably effected in the molar ratio 1:1.

The use of a solvent in the reaction is generally unnecessary, but it may be of advantage in certain cases, such as when reaction mixtures of high viscosity are formed. If necessary, organic solvents such as dioxane, isopropanol, tetrahydrofuran, digylcol dimethyl ether may be used The working up of the reaction mixtures may be carried out by distillation or by recrystallisation and the unreacted starting materials may be used again without a further purification operation, so that the syntheses may be carried out both discontinuously or continuously The process of the invention is marked by particular simplicity of operation No special measures such as exclusion of air or moisture, or addition of catalysts or initiators such as peroxides, are necessary so that a separation of foreign materials is also not required The products of the process are utilisable in many ways In pest control they can be used as insecticides and fungicides, they serve as valuable additives in the lubricant field, as for example, as oxidation and corrosion retarders, extreme-pressure additives, sludge dispersing substances, foam regulators, or antioxidants for rubber compositions, and may further also be used as emulsifiers. They are also valuable starting materials for other reactions such as alkoxylations, sulfonations and so on, which lead to products having a surface-active nature and may be used as wetting agents or as textile assistants in washing and cleaning compositions. Further classes of compound which are available starting from 2-hydroxy-dialkylsulfides are β-hydroxy-substituted sulfoxides, sulfones, sulfonium and sulfoxonium compounds.

In the following examples there are described several preferred embodiments to illustrate the invention. However, it should be understood that the invention is not intended to be limited to the specific embodiments.

Example 1

A mixture of 56 gm. (0.5 mol) of n-octene-1 and 81 gm. (0.5 mol) of 2-hydroxy-1-mercapto-octane was stirred for 4 hours at 20° C. and the reaction mixture was then distilled to obtain a 71% yield of 2-hydroxyoctyl octylsulfide with a boiling point of 140–146° C. at 0.05 mm. Hg and a refractive index of $n_D^{20}=1.4710$. The product had a sulfur content of 11.8% (calculated—11.7%) and the structure of the product was confirmed by its infrared spectrum and its NMR spectrum.

In order to illustrate the surprisingly high yield of the process of the invention, the same reaction was effected at different temperatures and reaction times and the yields were compared with the yields obtained by the identical reaction of 56 gm. (0.05 mol) of n-octene-1 and 73 gm. (0.5 mol) of 1-mercapto-n-octane to obtain di-n-octylsulfide. The results are shown in Table I.

TABLE I

| Starting mercapto | Temp., °C. | Time of reaction | Percent yield |
|---|---|---|---|
| 2-hydroxy-1-mercapto-n-octane | 30 | 2 | 65 |
|  | 40 | 2 | 78 |
|  | 50 | 1 | 65 |
|  | 60 | 1 | 69 |
| 1-mercapto-n-octane | 20 | 4 | 0 |
|  | 30 | 2 | 0 |
|  | 40 | 2 | 5 |
|  | 50 | 1 | 5 |
|  | 60 | 1 | 3 |

Examples 2 to 9

Using the procedure of Example 1, 0.5 mol of the 2-hydroxy-1-mercapto-alkanes and 0.5 mol of the olefins set forth in Table II were reacted and after distilling off unreacted starting materials the final products of Table II were crystallized from ethanol. The structure of the final products was confirmed by their infrared and NMR spectra.

TABLE II

| Example | Reaction components | Temp., °C. | Reaction time in hours | Product | B.P. (1), M.P. (2), (°C.) | Refractive index, $n_D^{20}$ | Percent yield |
|---|---|---|---|---|---|---|---|
| 2 | n-Hexene-1 and 2-hydroxy-1-mercapto-hexane. | 25 | 2 | 2-hydroxyhexyl-hexylsulfide | (1) 79–81/0.03 mm. Hg. | 1.4707 | 81 |
| 3 | n-Decene-1 and 2-hydroxy-1-mercapto-hexane. | 40 | 2 | 2-hydroxyhexyl-decyl-sulfide | (1) 188–190/0.16 mm. Hg. | 1.4711 | 80 |
| 4 | n-Octene-2 and 2-hydroxy-1-mercapto-octane. | 50 | 3 | 2-hydroxyoctyl-1'-methyl-heptyl-sulfide | (1) 111–120/0.01 mm. Hg. | 1.4760 | 40 |
| 5 | n-Dodecene-1 and 2-hydroxy-1-mercapto-octane. | 50 | 2 | 2-hydroxyoctyl-dodecyl-sulfide | (2) 22–23 |  | 63 |
| 6 | n-Dodecene-1 and 2-hydroxy-1-mercapto-octadecane. | 70 | 2 | 2-hydroxyocta-decyl-dodecyl-sulfide | (2) 59–60 |  | 72 |
| 7 | n-Octadecene-1 and 2-hydroxy-1-mercapto-octane. | 25 | 2 | 2-hydroxyoctyl-octadecyl-sulfide | (2) 51–52 |  | 64 |
| 8 | n-Octadecene-1 and 2-hydroxy-1-mercapto-octadecane. | 65 | 3 | 2-hydroxyocta-decyl-octadecyl-sulfide. | (2) 75–76 |  | 85 |
| 9 | Methyl ester of n-undecene-10-carboxylic acid and 2-hydroxy-1-mercapto-octadecane. | 60 | 3 | Methyl ester of 12-thia-(14)-hydroxy-triacontanoic acid. | (2) 68–69 |  | 66 |

Example 10

9.2 g. (0.1 mol) of bicyclo-(2,2,1)-heptadiene-(2,5) and 16.2 g. (0.1 mol) of 2-hydroxy-1-mercapto-octane were stirred for 1 hour at a reaction temperature of 25° C. and the reaction mixture was worked up by distillation. A fraction boiling at 130–132° C. at 0.03 mm. Hg, and having a refractive index of $n_D^{20}=1.5080$ was obtained in 85% yield. NMR spectroscopic investigation indicated that the reaction product consisted of about 75% of 3-[β-hydroxy-octylmercapto]-tricyclo-[2,2,1,0¹]-heptane and about 25% of 2-[β-hydroxyoctyl-mercapto]-bicyclo-[2,2,1]-heptene-(5).

Example 11

Using the procedure of Example 10, 9.2 g. (0.1 mol) of bicyclo-(2,2,1)-heptadiene-(2,5) were reacted with 16.2 g. (0.1 mol) of an isomeric mixture of 2-hydroxy-3-mercapto-octane and 3-hydroxy-2-mercapto-octane to obtain a 93% yield of an isomeric mixture boiling at 118–126° C. at 0.03 mm. Hg and having a refractive index of $n_D^{20}=1.5095$.

Example 12

68 g. (0.5 mol) of n-decatriene-1,4,9 were stirred for 5 hours at 40° C. with 218 g. (1 mol) of 2-hydroxy-1-mercapto-dodecane and after distilling off the unreacted starting material, there was obtained an 88% yield of 13,24-di-thia-11,26-dihydroxy-hexatriacontene-(17) melting at 63–64° C. after recrystallization from acetone.

Example 13

21.8 g. (0.2 mol) of cyclooctadiene-1,5 and 43.6 g. (0.2 mol) of 2-hydroxy-1-mercapto-dodecane were stirred for 4 hours at a reaction temperature of 25° C. By working up the reaction mixture by distillation, there was obtained an 81% yield of [β-hydroxy-dodecylmercapto]-cyclooctene-(4) with a boiling point of 130–142° C. at 0.03 mm. and a refractive index $n_D^{20}=1.4790$.

Example 14

9.2 g. (0.1 mol) of bicyclo-[2,2,1]-heptadiene-2,5 and 13.2 g. (0.1 mol) of 2-hydroxy-1-mercapto-cyclohexane were reacted at 25° C. for one hour to obtain after distillation of the reaction mixture an 80% yield of an isomeric mixture of 3-[β-hydroxycyclohexylmercapto]-tricyclo-[2,2,1,0¹]-heptane and 2-[β-hydroxycyclohexylmercapto]-bicyclo-[2,2,1]-heptene-(5) boiling at 114–126° C. at 0.05 mm. and having a refractive index of $n_D^{20}=1.5452$.

Various modifications of the products and process of the invention may be made without departing from the spirit and scope thereof and it is to be understood that the invention is to be limited only as defined in the appended claim.

We claim:
1. A thia-alkanol of the formula

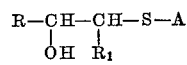

wherein R is an aliphatic hydrocarbon group of 1 to 22 carbon atoms, $R_1$ is selected from the group consisting of hydrogen and aliphatic hydrocarbon group of 1 to 21 carbon atoms with the sum of carbon atoms in R and $R_1$ being 4 to 22 and R and $R_1$, taken together with the ethylene group to which they are attached, form a cycloaliphatic hydrocarbon ring of 6 to 12 carbon atoms and A is selected from the group consisting of aliphatic hydrocarbon of 6 to 18 carbon atoms and cycloaliphatic hydrocarbon having 6 to 12 carbon atoms substituted with one to two groups of the formula

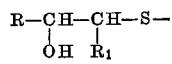

References Cited

UNITED STATES PATENTS

| | | | |
|---|---|---|---|
| 2,776,997 | 1/1957 | Doumaji | 260—609 A |
| 2,927,946 | 3/1960 | Petty | 260—609 D |
| 3,328,467 | 6/1967 | Hamilton | 260—609 AX |
| 3,522,314 | 7/1970 | Warner | 260—609 A |
| 2,768,975 | 10/1956 | Scharmann | 260—609 B |

FOREIGN PATENTS

| | | | |
|---|---|---|---|
| 209,078 | 6/1940 | Switzerland | 260—609 F |
| 208,875 | 5/1940 | Switzerland | 260—609 F |
| 208,874 | 5/1940 | Switzerland | 260—609 F |
| 208,873 | 5/1940 | Switzerland | 260—609 F |
| 202,243 | 4/1939 | Switzerland | 260—609 F |

LEWIS GOTTS, Primary Examiner

D. R. PHILLIPS, Assistant Examiner

U.S. Cl. X.R.

252—45; 260—609 B, 609 A, 609 E, 607 A, 607 B; 424—327